United States Patent
Jang et al.

(10) Patent No.: US 11,532,850 B2
(45) Date of Patent: Dec. 20, 2022

(54) RECHARGEABLE BATTERY HAVING PLURALITY OF VENTS

(71) Applicant: Samsung SDI Co., Ltd., Yongin-si (KR)

(72) Inventors: Jaesoon Jang, Yongin-si (KR); Miran Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 16 days.

(21) Appl. No.: 17/263,505

(22) PCT Filed: Jun. 12, 2019

(86) PCT No.: PCT/KR2019/007061
§ 371 (c)(1),
(2) Date: Jan. 26, 2021

(87) PCT Pub. No.: WO2020/027430
PCT Pub. Date: Feb. 6, 2020

(65) Prior Publication Data
US 2021/0175576 A1    Jun. 10, 2021

(30) Foreign Application Priority Data

Jul. 31, 2018  (KR) .................. 10-2018-0089318

(51) Int. Cl.
*H01M 50/308*    (2021.01)
*H01M 50/342*    (2021.01)
(Continued)

(52) U.S. Cl.
CPC ......... *H01M 50/308* (2021.01); *H01M 50/15* (2021.01); *H01M 50/183* (2021.01);
(Continued)

(58) Field of Classification Search
CPC .......... H01M 50/308; H01M 50/3425; H01M 10/0583–0587; H01M 50/183;
(Continued)

(56) References Cited

U.S. PATENT DOCUMENTS 5,538,807 A * 7/1996 Hagiuda ............... H01M 50/20
  429/100
2006/0093895 A1 5/2006 Lim
(Continued)

FOREIGN PATENT DOCUMENTS

CN  1767230 A   5/2006
CN  101826605 A  9/2010
(Continued)

OTHER PUBLICATIONS

Machine translation of JP-2009187759-A (Year: 2009).*
(Continued)

*Primary Examiner* — William E McClain
*Assistant Examiner* — Jason Barton
(74) *Attorney, Agent, or Firm* — Lewis Roca Rothgerber Christie LLP

(57) ABSTRACT

A rechargeable battery according to an embodiment of the present invention includes: an electrode assembly; a case for receiving the electrode assembly; a cap plate combined to an opening of the case to close and seal an inside of the case and including a plurality of vent units; an elevation member penetrated and installed in the cap plate and moving by an internal pressure of the case; and a plurality of vent plates for closing and sealing the respective vent units, wherein the vent plate is connected to the elevation member through a connection member and links to the elevation member.

14 Claims, 6 Drawing Sheets

(51) Int. Cl.
    *H01M 50/183* (2021.01)
    *H01M 50/15* (2021.01)
    *H01M 50/317* (2021.01)

(52) U.S. Cl.
    CPC ..... *H01M 50/317* (2021.01); *H01M 50/3425* (2021.01); *H01M 2200/20* (2013.01)

(58) Field of Classification Search
    CPC ............. H01M 50/15; H01M 2200/20; H01M 50/317; H01M 50/103; H01M 50/147; H01M 50/186; Y02E 60/10; Y02P 70/50
    See application file for complete search history.

(56) References Cited

U.S. PATENT DOCUMENTS

| | | |
|---|---|---|
| 2010/0086835 A1 | 4/2010 | Kim |
| 2011/0020674 A1 | 1/2011 | Fujita |
| 2013/0136959 A1 | 5/2013 | Baek et al. |
| 2017/0018748 A1* | 1/2017 | Matsuura .......... H01M 50/3425 |
| 2017/0279098 A1 | 9/2017 | Lee |
| 2017/0352854 A1* | 12/2017 | Doyle ................. H01M 50/308 |
| 2019/0379011 A1 | 12/2019 | Park et al. |

FOREIGN PATENT DOCUMENTS

| | | | |
|---|---|---|---|
| CN | 203398194 U | 1/2014 | |
| EP | 3 582 284 A1 | 12/2019 | |
| JP | 8-124554 A | 5/1996 | |
| JP | 2005-216775 A | 8/2005 | |
| JP | 2009-187759 A | 8/2009 | |
| JP | 2009187759 A * | 8/2009 | ............. Y02E 60/10 |
| KR | 1996-0000554 A | 1/1996 | |
| KR | 2000-0008831 U | 5/2000 | |
| KR | 10-2004-0099525 A | 12/2004 | |
| KR | 10-2009-0031444 A | 3/2009 | |
| KR | 10-1084071 B1 | 11/2011 | |
| KR | 10-2017-0100290 A | 9/2017 | |
| KR | 10-2017-0109919 A | 10/2017 | |
| KR | 10-1863091 B1 | 6/2018 | |
| WO | WO 201/048075 A1 | 3/2018 | |

OTHER PUBLICATIONS

International Search Report of corresponding PCT/KR2019/007061, dated Sep. 16, 2019, 4 pages.
Chinese Office action issued in application No. CN 201980050129.4, dated Jul. 20, 2022, 14 pages.
Extended European Search Report issued in corresponding application No. EP19845546.1, dated Mar. 28, 2022, 7 pages.

* cited by examiner

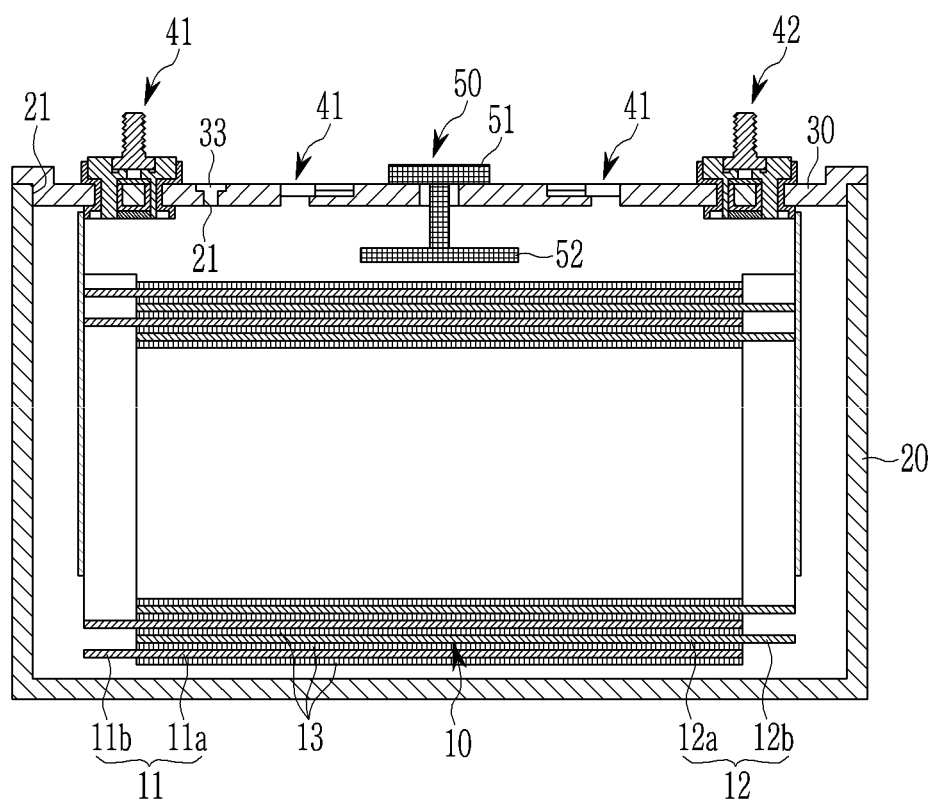
【Figure 1】

[Figure 2]
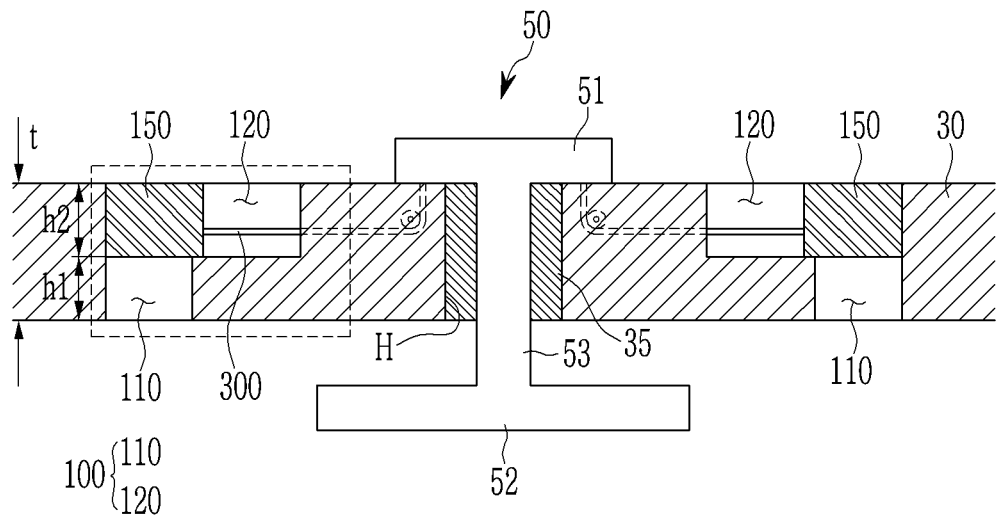
[Figure 3]
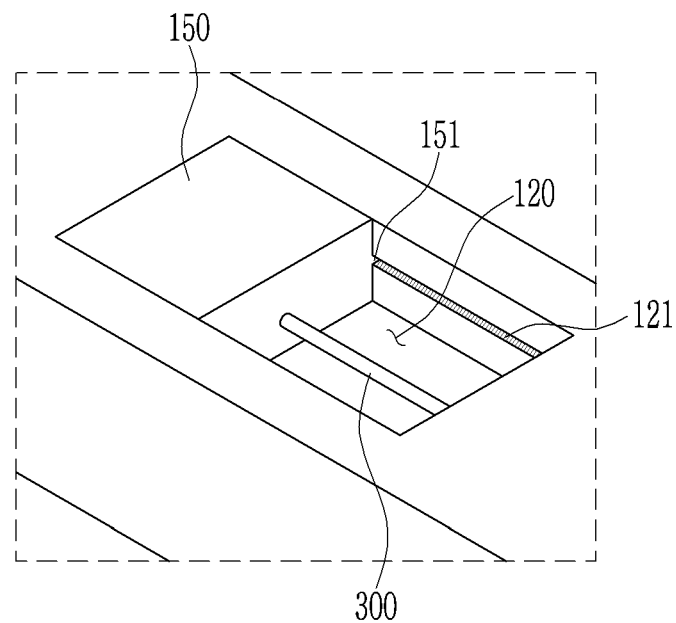

[Figure 4]
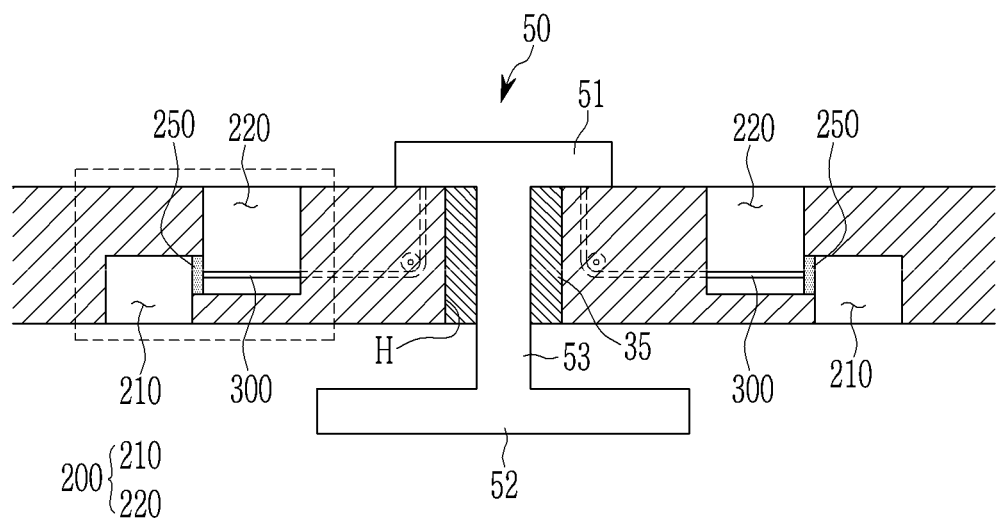
[Figure 5]
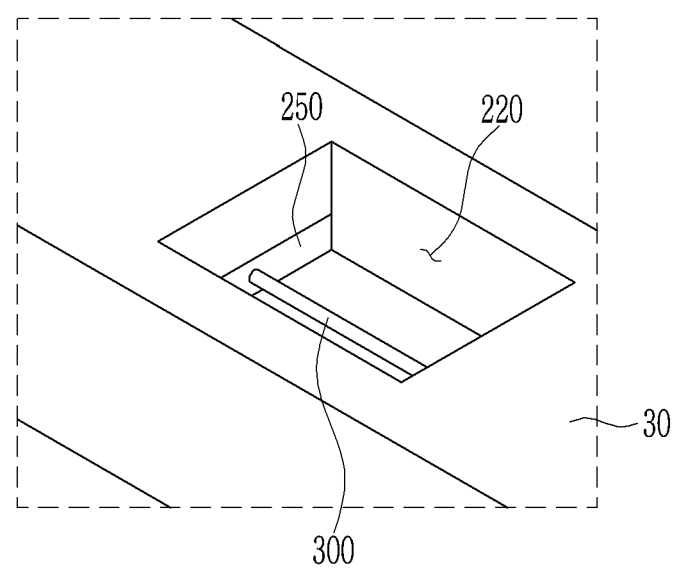

【Figure 6】
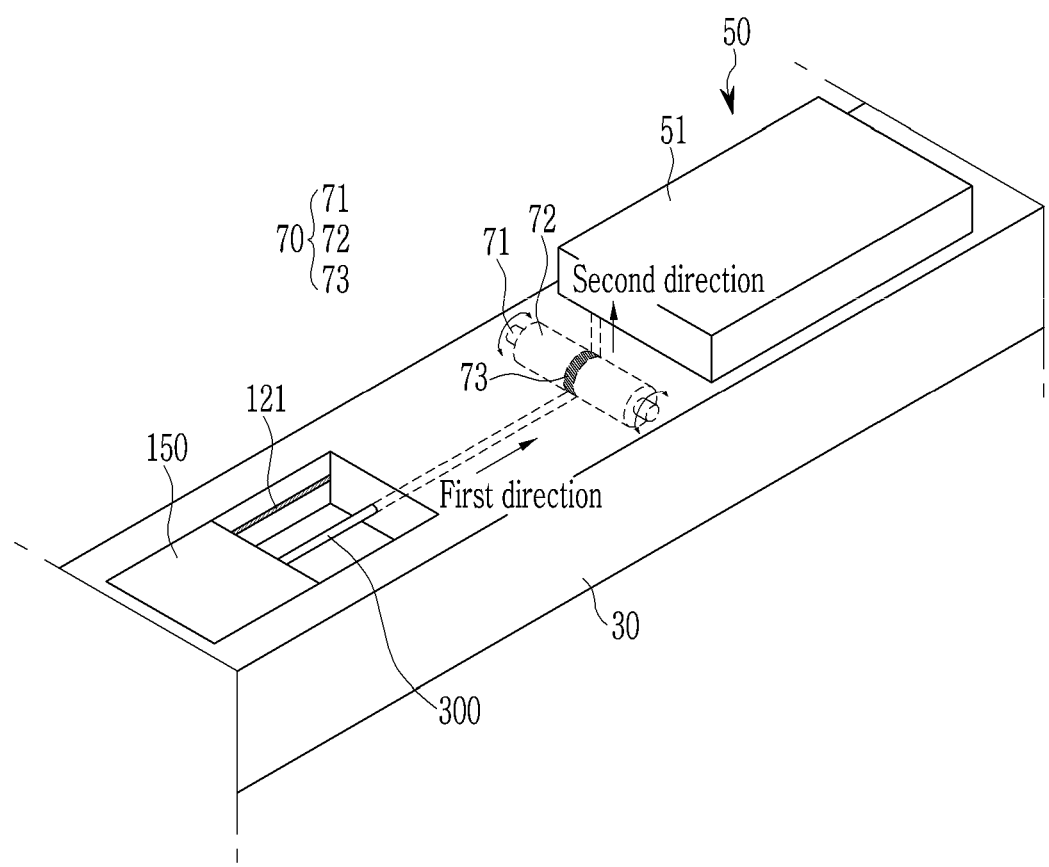

【Figure 7】
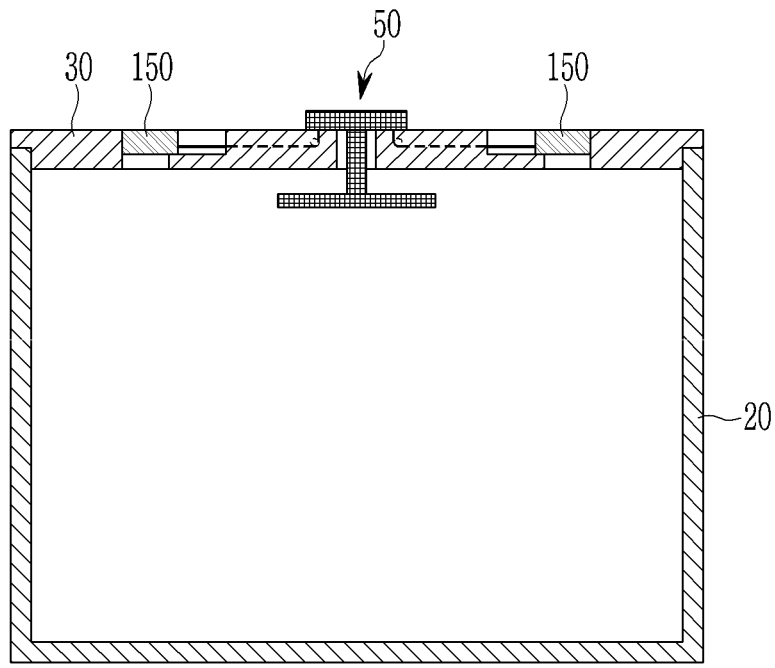
【Figure 8】
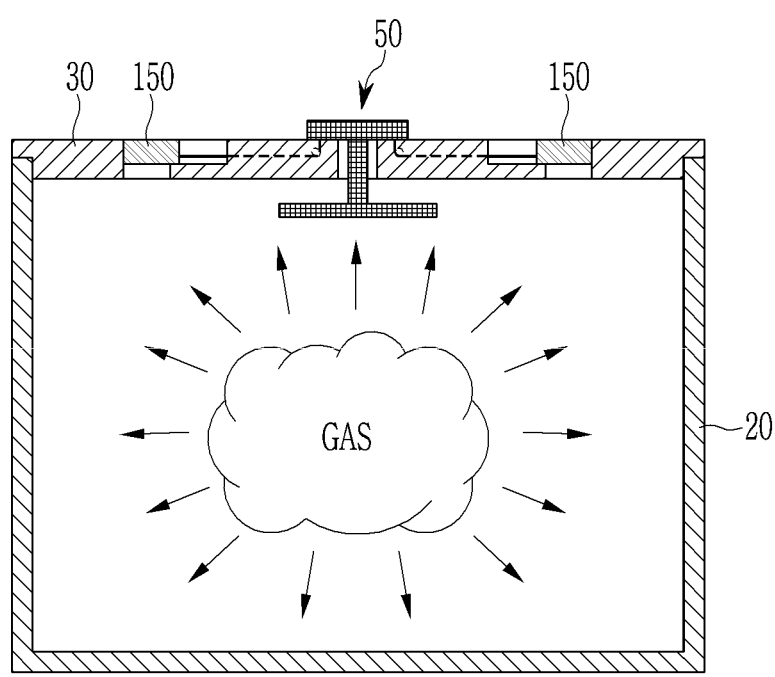

[Figure 9]
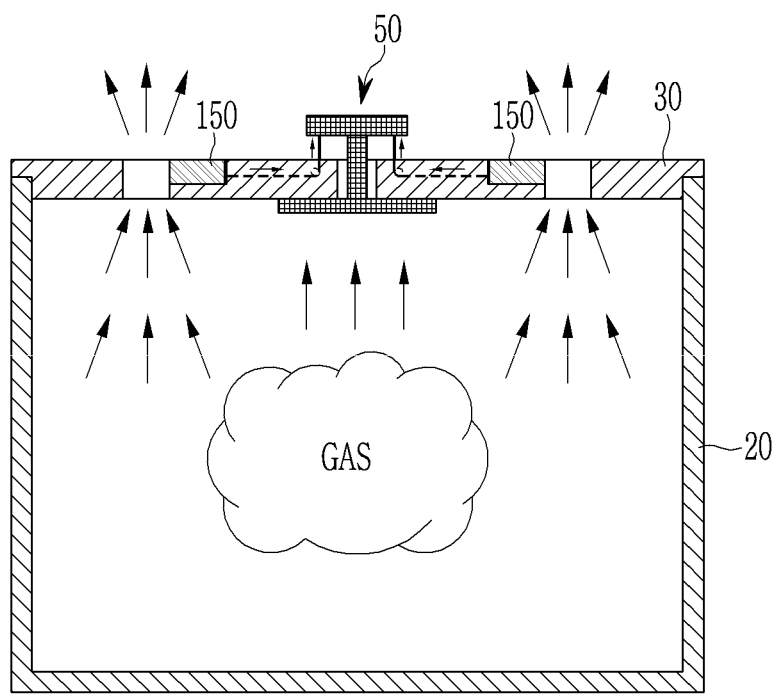

RECHARGEABLE BATTERY HAVING PLURALITY OF VENTS

CROSS-REFERENCE TO RELATED APPLICATION(S)

This application is a U.S. National Phase Patent Application of International Application Number PCT/KR2019/007061, filed on Jun. 12, 2019, which claims priority to Korean Patent Application Number 10-2018-0089318, filed on Jul. 31, 2018, the entire content of each of which is incorporated herein by reference.

TECHNICAL FIELD

The present disclosure relates to a rechargeable battery for simultaneously opening a plurality of vent units and quickly discharging an inner gas.

BACKGROUND ART

A rechargeable battery can be repeatedly charged and discharged, differing from a primary battery that is incapable of being recharged. The rechargeable battery is used in portable small electronic devices such as smartphones, laptops, and camcorders, or is used as a motor driving power source such as for hybrid vehicles.

The rechargeable battery includes an electrode assembly including a positive electrode, a negative electrode, and a separator positioned between the positive electrode and the negative electrode. The electrode assembly is received inside the case to perform charging and discharging, and an electrode terminal is provided to the case to supply or receive a current. The case may have a square shape or nay be a pouch type.

A vent unit may be provided to the case of the rechargeable battery. Regarding the vent unit, a vent plate is connected to a lower portion of the vent hole provided in the case. The vent plate is made thinner than the case, so when pressure inside the case increases because of overcharging, the vent plate is broken in advance to other portions to discharge a gas and secure safety of the rechargeable battery.

Recently, demands for capacity-increased rechargeable batteries such as medium to large rechargeable batteries are increasing, and concerns about the safety of the rechargeable batteries with increased integration are increasing.

However, the conventional rechargeable battery provides one vent unit for the cap plate, so it is difficult to quickly discharge the gas generated in the rechargeable battery.

DISCLOSURE

The present invention has been made in an effort to provide a rechargeable battery with a plurality of vent plates respectively closing and sealing a plurality of vent units to quickly discharge inner gas by being simultaneously separated from the respective vent units and opening the vent units when a pressure in a case reaches a set value.

An embodiment of the present invention provides a rechargeable battery including: an electrode assembly; a case for receiving the electrode assembly; a cap plate combined to an opening of the case to close and seal an inside of the case and including a plurality of vent units; an elevation member penetrated and installed in the cap plate and moving by an internal pressure of the case; and a plurality of vent plates for closing and sealing the respective vent units, wherein the vent plate is connected to the elevation member through a connection member and links to the elevation member.

In the above-configured rechargeable battery according to an embodiment of the present invention, when the elevation member moves up by the internal pressure caused by the gas generated in the case, a plurality of vent plates linking to the elevation member are simultaneously separated from the respective vent units to open the vent units, thereby quickly discharging the gas.

The elevation member may be installed in a center portion with respect to a length direction of the cap plate.

The vent units may be spaced from a through-hole of the cap plate in which the elevation member is penetrated and installed by a predetermined distance.

One pair of vent units from among the vent units may be spaced from the through-hole by a same distance.

The elevation member may include: a penetration unit passing through the cap plate so that a first end is exposed outside the case and a second end is positioned inside the case; a first extension generated when the first end of the penetration unit horizontally extends in respective directions; and a second extension generated when the second end of the penetration unit horizontally extends in respective directions.

A gasket for maintaining a sealed state of the rechargeable battery may be provided between the penetration unit and a through-hole of the cap plate.

The cap plate may include a moving guide unit positioned between the vent unit and the elevation member and guiding a moving path of the connection member.

The moving guide unit may include a rotor combined in a rotatable way to a rotation shaft installed while arranged in parallel to a width direction of the cap plate.

A settling groove formed to be concave so as to be indented toward the rotation shaft may be provided on an external circumferential surface of the rotor to allow the connection member to contact the rotor.

The vent unit may include: a first vent unit positioned on a lower portion of the cap plate and connected to an inside of the case; and a second vent unit positioned on an upper portion of the cap plate and including an inside connected to the first vent unit, and the vent plate may be installed in a portion in which the first vent unit is connected to the second vent unit to close and seal the vent unit.

A sealing portion is positioned along an exterior circumference of the vent plate on a connection portion of the first vent unit and the second vent unit to improve the sealing property of the vent unit.

The first vent unit may be connected to a bottom side of a second vent unit positioned in a direction becoming distant from the elevation member.

The second vent unit may include a guide groove provided long in a length direction of the cap plate on respective interior circumferences, the vent plate may include a guide protrusion positioned on respective sides facing the guide groove, and the guide protrusion may engage the guide groove and may slide along the guide groove.

The first vent unit may be connected to one side of a second vent unit positioned in a direction becoming distant from the elevation member.

The vent plate may be installed to be perpendicular to a cap plate, on a connection portion of the first vent unit and the second vent unit.

According to the embodiment of the present invention, when the pressure in the case reaches the set value, a plurality of vent plates linking to the elevation member moving up by the pressure in the case are simultaneously separated from the respective vent units, so the inner gas may be quickly discharged through the opened vent units.

According to the embodiment of the present invention, deterioration of the electrode assembly by the increase of the temperature in the rechargeable battery caused by the heat of the inner gas in the rechargeable battery may be prevented by quickly discharging the inner gas in the rechargeable battery.

DESCRIPTION OF THE DRAWINGS

FIG. 1 shows a cross-sectional view of a rechargeable battery according to a first embodiment of the present invention.

FIG. 2 shows a detailed cross-sectional view of an elevation member and a vent unit of FIG. 1.

FIG. 3 shows an enlarged perspective view of a vent unit of FIG. 2.

FIG. 4 shows a detailed cross-sectional view of an elevation member and a vent unit of a rechargeable battery according to a second embodiment of the present invention.

FIG. 5 shows an enlarged perspective view of a vent unit of FIG. 4.

FIG. 6 shows perspective view of a vent plate according to a first embodiment of the present invention, connected to an elevation member through a connection member.

FIG. 7 to FIG. 9 show schematic diagrams regarding a process for discharging inner gas through a vent unit of a rechargeable battery according to a first embodiment of the present invention.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

The size and thickness of each configuration shown in the drawings are arbitrarily shown for better understanding and ease of description, but the present invention is not limited thereto.

Throughout this specification and the claims that follow, when it is described that an element is "connected" to another element, the element may be "directly connected" to the other element or "indirectly connected" to the other element through a third member. Unless explicitly described to the contrary, the word "comprise" and variations such as "comprises" or "comprising" will be understood to imply the inclusion of stated elements but not the exclusion of any other elements.

FIG. 1 shows a cross-sectional view of a rechargeable battery according to a first embodiment of the present invention.

Referring to FIG. 1, the rechargeable battery includes an electrode assembly 10 for repeatedly performing a charging and discharging operation, a case 20 for receiving the electrode assembly 10 and an electrolyte solution, a cap plate 30 combined to an opening 21 of the case 20, and electrode terminals installed on the cap plate 30, that is, a negative terminal 41 and a positive terminal 42.

For example, the electrode assembly 10 is formed by winding electrodes, that is, a negative electrode 11, a separator 13, and a positive electrode 12 that are stacked with the negative electrode 11 and the positive electrode 12, in a jelly-roll state, on respective sides of the separator 13 that is an electrical insulator.

Further, the electrode assembly may be assembled by stacking the negative electrode and the positive electrode respectively made of a single plate with the separator therebetween, or by alternately stacking the negative electrode, the separator, and the positive electrode (not shown).

The negative electrode 11 and the positive electrode 12 include coated regions 11a and 12a made by applying an active material (not shown) to a current collector, and uncoated regions 11b and 12b made as exposed portions of the current collector to which no active material is applied on one side of each of the coated regions 11a and 12a. For example, the current collector of the negative electrode 11 may be formed of a copper thin film, and the current collector of the positive electrode 12 may be formed of an aluminum thin film.

The uncoated region 11b of the negative electrode 11 is positioned on one end of the negative electrode 11 along the coated region 11a of the wound negative electrode 11. The uncoated region 12b of the positive electrode 12 is positioned on one end of the positive electrode 12 along the coated region 12a of the wound positive electrode 12. That is, the uncoated regions 11b and 12b are disposed on respective ends of the electrode assembly 10 to allow electrical connection of the electrode assembly 10 and the negative terminal 41 and positive terminal 42. The electrode assembly 10 generates gas during a charging and discharging process.

The case 20 may have a rectangular parallelepiped shape for forming an opening 21 on one side, allowing insertion of the electrode assembly 10 through the opening 21, and providing a receiving space of the electrode assembly 10 and the electrolyte solution.

The cap plate 30 is combined with the opening 21 of the case 20 to close and seal the inside of the case 20 from the outside, thereby setting the closed and sealed receiving space together with the case 20. For example, when the case 20 and the cap plate 30 are made of aluminum, they are combined to each other and are then welded, and they may be made of the same material and may have an excellent welding property.

FIG. 2 shows an enlarged cross-sectional view of an elevation member and a vent unit according to a first embodiment of the present invention.

Referring to FIG. 1 and FIG. 2, the cap plate 30 may include an electrolyte injection opening 31, a through-hole (H), and two vent units 100 and 100'.

The electrolyte injection opening 31 allows injection of the electrolyte solution into the case 20 after a combination of the cap plate 30 and the case 20. After the electrolyte solution is injected, the electrolyte injection opening 31 is sealed by a sealing cap 33.

The through-hole (H) may be provided to penetrate the cap plate 30 so that the inside of the case 20 may be connected to the outside, and it may be positioned on a center portion with respect to a length direction of the cap plate 30. An elevation member 50 may be installed in the through-hole (H).

The elevation member 50 may be inserted into the through-hole (H) and may be installed in the cap plate 30, and when the internal pressure of the case 20 reaches a predetermined pressure value, the elevation member 50 may move up by the internal pressure of the case.

The elevation member 50 may include a first extension 51, a second extension 52, and a penetration unit 53.

The penetration unit 53 has a column shape and penetrates the cap plate 30 so that an upper end may be exposed outside the case 20, and a lower end may be positioned inside the case 20.

In this instance, a gasket 35 is provided between the penetration unit 53 and the through-hole (H) of the cap plate 30 into which the penetration unit 53 is penetrated and inserted, thereby acquiring air tightness and maintaining the sealed state.

The first extension 51 and the second extension 52 may be respectively positioned on the upper end and the lower end of the penetration unit 53.

The first extension 51 may be formed when the upper end of the penetration unit 53 exposed outside the case 20 horizontally extends in respective directions.

The first extension 51 may have a plate-shaped structure with a circular or polygonal cross-section and may be formed by a horizontal extension.

The first extension 51 may be pressurized on an upper side of the cap plate 30 while the pressure inside the case 20 has a value that is less than a predetermined pressure and the elevation member 50 maintains its stopped state.

The second extension 52 may be formed when the lower end of the penetration unit 53 positioned inside the case 20 horizontally extends in respective directions.

The second extension 52 may also have a plate-shaped structure with a circular or polygonal cross-section and may be formed by a horizontal extension in a like manner of the first extension 51.

Particularly, an area of the cross-section of the second extension 52 may be greater than the size of the through-hole (H) of the cap plate 30.

This is to allow the second extension 52 to be caught on a bottom side of the cap plate 30 provided near the edge of the through-hole (H), thereby preventing the elevation member 50 from leaving the cap plate 30 while the elevation member 50 moves up by the internal pressure.

The vent unit 100 may be positioned on the cap plate 30 and discharges the inner gas generated by charging and discharging in the case 20 to the outside, thereby preventing the rechargeable battery from being exploded. A plurality of vent units 100 are positioned on the cap plate 30, and the respective vent units 100 are closed and sealed by the vent plate 150.

The vent units 100 may be spaced from the through-hole (H) in which the elevation member 50 is installed by a predetermined distance, and particularly, one pair of vent units 100 and 100' may be spaced from the through-hole (H) by the same distance.

Regarding the rechargeable battery according to a first embodiment of the present invention, the one pair of vent units 100 and 100' have the same configuration, so one vent unit 100 will be described.

FIG. 3 shows an enlarged perspective view of a vent unit according to a first embodiment of the present invention.

Referring to FIG. 2 and FIG. 3, the vent unit 100 may include a first vent unit 110 and a second vent unit 120.xxxxxxxxxxxxx The first vent unit 110 may be positioned at a lower portion of the cap plate 30 and may be connected to the inside of the case 20, and the second vent unit 120 may be positioned at an upper portion of the cap plate 30 and may be connected, while exposed, to the first vent unit 110.

Regarding the above-noted configuration, a sum of a height h1 of the first vent unit 110 and a height h2 of the second vent unit 120 may be equal to the thickness (t) of the cap plate 30.

A vent plate 150 is installed in a portion in which the first vent unit 110 is connected to the second vent unit 120 to shut a connection passage connected to the outside from the inside of the case 20 and thereby close and seal the inside of the case 20.

That is, when the internal pressure of the rechargeable battery reaches a predetermined pressure value, the vent plate 150 linked to the elevation member 50 is drawn toward the through-hole (H) so it is separated from the vent unit 100, and the gas inside the case 20 may pass through the first vent unit 110 and the second vent unit 120 and may be discharged to the outside The first vent unit 110 may have a passage structure positioned between the bottom side of the second vent unit 120 and the space inside the case 20 and connecting the inside of the case 20 and the second vent unit 120.

The first vent unit 110 may be positioned to be connected to the bottom side of the second vent unit 120 position to be in a direction becoming distant from the elevation member 50.

The horizontal cross-section of the first vent unit 110 may be less than the horizontal cross-section of the second vent unit 120.

The second vent unit 120 is a concave space generated when the upper side of the cap plate 30 is indented, and it may have an internal configuration having a rectangular cross-section.

A guide groove 121 formed in a length direction of the cap plate 30 may be provided on interior circumferences of respective sides of the second vent unit 120.

The vent plate 150 may be installed on a portion connected to the first vent unit 110 on the second vent unit 120 to close and seal the inside of the case 20 from the outside, and a sealing portion may be positioned along an exterior circumference of the vent plate 150 so as to improve the sealing property.

The vent plate 150 may have a hexahedral shape and may include guide protrusions 151 positioned on respective lateral sides facing the guide groove 121.

The guide protrusion 151 may engage with the guide groove 121 and may slide along the guide groove 121.

However, the above-noted sliding is possible when the vent plate 150 links to the elevation member through a connection member to be described and the vent plate 150 is separated from the vent unit 100.

FIG. 4 shows a detailed cross-sectional view of an elevation member and a vent unit of a rechargeable battery according to a second embodiment of the present invention, and FIG. 5 shows an enlarged perspective view of a vent unit according to a second embodiment of the present invention.

Referring to FIG. 4 and FIG. 5, a vent unit 200 may include a first vent unit 210 and a second vent unit 220.

The first vent unit 210 may be formed at the lower portion of the cap plate 30 and may be connected to one lateral side of the second vent unit 220. Particularly, the first vent unit 210 may be connected to one lateral side of the second vent unit 220 positioned in the direction becoming distant from the elevation member 50.

The first vent unit 210 is a concave space generated when the lower bottom side of the cap plate 30 is indented, and it may have an internal configuration having a rectangular cross-section.

The second vent unit 220 is a concave space generated when the upper side of the cap plate 30 is indented, and it may have an internal configuration having a rectangular cross-section.

Particularly, the second vent unit 220 may be connected to the first vent unit 210 on one lateral side positioned in a direction becoming distant from the elevation member 50 from among four inner lateral sides.

As described, a vent plate 250 is installed on a portion in which the first vent unit 210 is connected to the second vent unit 220 to close and seal the inside of the case 20 from the outside.

The vent plate 250 may have a thin plate shape, and a sealing portion may be positioned along the exterior circumference of the vent plate 250 on the portion in which the first vent unit 210 is connected to the second vent unit 220, thereby improving the sealing property.

The vent plate 250 may be connected to the elevation member through a connection member to be described, may be separated from the vent unit 200, and may open the vent unit 200.

The present invention exemplifies that the vent plate respectively installed in a plurality of vent units links to the elevation member through a connection member, is simultaneously separated from the vent unit, and opens the vent unit, so the connection member will now be described. The connection member will now be described with reference to a first embodiment of the present invention, but is not limited thereto.

FIG. 6 shows perspective view of a vent plate according to a first embodiment of the present invention, connected to an elevation member through a connection member, and FIG. 7 to FIG. 9 show schematic diagrams of a process for discharging inner gas through a vent unit of a rechargeable battery according to a first embodiment of the present invention.

Referring to FIG. 2, FIG. 3, FIG. 6, and FIG. 7 to FIG. 9, the connection member 300 is positioned between a plurality of vent units 100 and the through-hole (H) on the cap plate 30.

The vent plate 150 is connected to the elevation member 50 through the connection member 300, so it moves in link with the elevation member 50.

The connection member 300 includes a first end combined to one side of the vent plate 150, and a second end combined to a lower portion of the first extension 51 of the elevation member 50 to thus connect the vent plate 150 and the elevation member 50. The connection member 300 has constant rigidity and has flexibility, and for example, it may be a wire or a cable.

A moving guide unit 70 may be provided between the vent unit 100 and the through-hole (H) on the cap plate 30, so it may guide a moving path of the connection member 300.

The moving guide unit 70 may include a rotor 72 combined in a rotatable way to a rotation shaft 71 installed while arranged in parallel to a width direction of the cap plate 30.

A settling groove 73 may be positioned to be concave in the external circumferential surface of the rotor 72 so that it may be indented toward the rotation shaft 71, so the connection member 300 may move while stably settled on the rotor 72.

The connection member 300 may, while a first end thereof is combined to one side of the vent plate 150, extend in the first direction to surround part of the external circumferential surface of the rotor 72, and may continuously extend in the second direction so that a second end may be combined to the lower portion of the first extension 51.

Therefore, the moving path of the connection member 300 may be changed to the second direction from the first direction by the rotor 72.

To sum up, regarding the rechargeable battery according to an embodiment of the present invention, when the pressure inside the case reaches a predetermined pressure value by the gas generated during the charging and discharging process of the electrode assembly 10, the elevation member 50 moves up by the pressure inside the case.

The elevation member 50 is connected to the vent plates 150 and 250 for closing and sealing the vent units 100 and 200 through the connection member 300, so the vent plates 150 and 250 move in link to the movement of the elevation member 50.

In this instance, a moving guide unit 70 is provided between the elevation member 50 and the vent units 100 and 200 to change the moving path of the connection member 300 that moves as the elevation member 50 moves up, so a force facing the elevation member 50 is applied to the vent plates 150 and 250 connected to the connection member 300, and the vent units 100 and 200 are separated.

Particularly, the present invention includes a plurality of vent plates for respectively closing and sealing a plurality of vent units, the respective vent plates link to the elevation member, and a plurality of vent plates are simultaneously opened, so the inner gas of the rechargeable battery may be quickly discharged to the outside and safety may be secured.

While this invention has been described in connection with what is presently considered to be practical embodiments, it is to be understood that the invention is not limited to the disclosed embodiments, but, on the contrary, is intended to cover various modifications and equivalent arrangements included within the scope of the appended claims.

<Description of symbols>

| | |
|---|---|
| 10: electrode assembly | 20: case |
| 30: cap plate | 50: elevation member |
| 51: first extension | 52: second extension |
| 53: penetration unit | 70: moving guide unit |
| 71: rotation shaft | 72: rotor |
| 100, 200: vent unit | 110, 210: first vent unit |
| 120, 220: second vent unit | 150, 250: vent plate |
| 300: connection member | |

The invention claimed is:

1. A rechargeable battery comprising:
   an electrode assembly;
   a case for receiving the electrode assembly;
   a cap plate combined to an opening of the case to close and seal an inside of the case and including a plurality of vent units;
   an elevation member penetrated and installed in the cap plate and configured to move in response to a buildup of an internal pressure of the case, the elevation member comprising:
   a penetration unit configured to pass through the cap plate so that a first end is exposed outside the case and a second end is positioned inside the case;
   a first extension at the first end of the penetration unit and extending outwardly in a direction crossing an extension direction of the penetration unit; and
   a second extension at the second end of the penetration unit and extending outwardly in a direction crossing an extension direction of the penetration unit; and a plurality of vent plates for closing and sealing the vent units, wherein a vent plate of the plurality of vent plates is connected to the elevation member through a connection member and links to the elevation member.

2. The rechargeable battery of claim 1, wherein the elevation member is installed in a center portion with respect to a length direction of the cap plate.

3. The rechargeable battery of claim 1, wherein the vent units are spaced from a through-hole of the cap plate in which the elevation member is penetrated and installed by a predetermined distance.

4. The rechargeable battery of claim 3, wherein one pair of vent units from among the vent units are spaced from the through-hole by a same distance.

5. The rechargeable battery of claim 1, wherein a gasket is provided between the penetration unit and a through-hole of the cap plate.

6. The rechargeable battery of claim 1, wherein the cap plate includes
a moving guide unit positioned between a vent unit of the plurality of vent units and the elevation member and is configured to guide a moving path of the connection member.

7. The rechargeable battery of claim 6, wherein the moving guide unit includes a rotor combined in a rotatable way to a rotation shaft installed while arranged in parallel to a width direction of the cap plate.

8. The rechargeable battery of claim 7, wherein a settling groove formed to be concave so as to be indented toward the rotation shaft is provided on an external circumferential surface of the rotor.

9. The rechargeable battery of claim 1, wherein a vent unit of the plurality of vent units includes:
a first vent unit positioned on a lower portion of the cap plate and connected to an inside of the case; and
a second vent unit positioned on an upper portion of the cap plate and including an inside connected to the first vent unit, and
the vent plate is installed in a portion in which the first vent unit is connected to the second vent unit.

10. The rechargeable battery of claim 9, wherein a sealing portion is positioned along an exterior circumference of the vent plate on a connection portion of the first vent unit and the second vent unit.

11. The rechargeable battery of claim 9, wherein the first vent unit is connected to a bottom side of the second vent unit, the first vent unit being closer to the elevation member than the second vent unit.

12. The rechargeable battery of claim 11, wherein the second vent unit includes a guide groove extending along an interior circumference of the second vent unit in a lengthwise direction of the cap plate,
the vent plate includes a guide protrusion at a side of the vent plate facing the guide groove, and
the guide protrusion engages the guide groove and slides along the guide groove.

13. The rechargeable battery of claim 9, wherein the first vent unit is connected to one side of the second vent unit, the first vent unit being closer to the elevation member than the second vent unit.

14. The rechargeable battery of claim 13, wherein the vent plate is installed to be perpendicular to the cap plate, on a connection portion of the first vent unit and the second vent unit.

\* \* \* \* \*